(12) United States Patent
Stephens, Jr. et al.

(10) Patent No.: US 6,428,763 B1
(45) Date of Patent: Aug. 6, 2002

(54) PROCESS FOR THE PRODUCTION OF IRON CARBIDE FROM IRON OXIDE USING EXTERNAL SOURCES OF CARBON MONOXIDE

(75) Inventors: Frank M. Stephens, Jr., Lakewood; Frank A. Stephens; Robert F. Hogsett, both of Arvada; John P. Hager, Golden, all of CO (US)

(73) Assignee: Iron Carbide Holdings, Ltd., Lakewood, CO (US)

(*) Notice: Subject to any disclaimer, the term of this patent is extended or adjusted under 35 U.S.C. 154(b) by 0 days.

(21) Appl. No.: 09/532,583

(22) Filed: Mar. 22, 2000

Related U.S. Application Data (63) Continuation-in-part of application No. 09/052,893, filed on Mar. 31, 1998, now abandoned.

(51) Int. Cl.$^7$ .............................................. C01B 31/30
(52) U.S. Cl. ..................................................... 423/439
(58) Field of Search .................................... 423/439

(56) References Cited

U.S. PATENT DOCUMENTS

| | | | |
|---|---|---|---|
| 1,775,713 A | 9/1930 | Bailey ...................... 75/10.38 |
| 1,786,386 A | 12/1930 | Ashcroft ........................ 75/691 |
| 2,535,042 A | 12/1950 | Cohn et al. ..................... 23/208 |
| 2,538,201 A | 1/1951 | Kalbach et al. ................. 75/26 |
| 2,598,393 A | 5/1952 | Kalling et al. .................. 75/69 |
| 2,653,088 A | 9/1953 | Pike ................................ 75/38 |
| 2,752,234 A | 6/1956 | Shipley ........................... 75/26 |
| 2,780,537 A | 2/1957 | Stelling et al. ................. 75/26 |
| 2,806,779 A | 9/1957 | Case ................................ 75/33 |
| 2,864,688 A | 12/1958 | Reed ............................... 75/26 |
| 2,894,831 A | 7/1959 | Old et al. ........................ 75/13 |
| 2,900,246 A | 8/1959 | Keith et al. ..................... 75/26 |
| 2,921,848 A | 1/1960 | Agarwal .......................... 75/26 |
| 2,978,318 A | 4/1961 | Kalling et al. .................. 75/43 |
| 3,021,208 A | 2/1962 | Feinman ........................ 75/26 |
| 3,135,598 A | 6/1964 | Mizushima ..................... 75/26 |
| 3,136,624 A | 6/1964 | Mader et al. ................... 75/34 |
| 3,140,168 A | 7/1964 | Halley et al. ................... 75/11 |
| 3,160,498 A | 12/1964 | Olt et al. ......................... 75/26 |
| 3,288,590 A | 11/1966 | Keith et al. ..................... 75/26 |
| 3,356,488 A | 12/1967 | Walsh ............................. 75/34 |
| 3,364,009 A | 1/1968 | Kemmetmüller ............... 75/25 |
| 3,364,010 A | 1/1968 | Mayer et al. ................... 75/26 |
| 3,364,011 A | 1/1968 | Porter, Jr. et al. .............. 75/26 |
| 3,499,755 A | 3/1970 | Morris ............................ 75/46 |
| 3,502,461 A | 3/1970 | Güttler et al. .................. 75/10 |
| 3,637,368 A | 1/1972 | Bessant ........................... 75/26 |
| 3,711,402 A | 1/1973 | Zumbrunn et al. ............ 210/63 |
| 3,719,811 A | 3/1973 | Munson .................. 235/151.12 |
| 3,761,244 A | 9/1973 | Hoffert ............................ 75/26 |
| 3,764,123 A | 10/1973 | Beggs et al. ................... 266/29 |
| 3,765,872 A | 10/1973 | Celada et al. .................. 75/34 |
| 3,885,023 A | 5/1975 | Gray et al. ................... 423/439 |
| 3,928,021 A | 12/1975 | Matsubara et al. ............ 75/35 |
| 4,042,376 A | 8/1977 | Collin ............................. 75/26 |
| 4,045,214 A | 8/1977 | Wetzel et al. .................. 75/60 |
| 4,053,301 A | 10/1977 | Stephens, Jr. .................. 75/11 |
| 4,073,642 A | 2/1978 | Collin et al. ................... 75/35 |
| 4,134,907 A | 1/1979 | Stephens, Jr. ............... 260/449 |
| 4,202,534 A | 5/1980 | Davis, Jr. ..................... 266/172 |
| 4,224,056 A | 9/1980 | Tomizawa et al. ............. 75/11 |
| 4,257,781 A | 3/1981 | Stephens, Jr. ................ 48/197 |
| 4,320,359 A | 3/1982 | Peterson et al. .............. 372/18 |
| 4,360,378 A | 11/1982 | Lindstrom ...................... 75/34 |
| 4,372,755 A | 2/1983 | Tolman et al. ................ 48/197 |
| 4,396,423 A | 8/1983 | Stephens, Jr. et al. .......... 75/25 |
| 4,398,945 A | 8/1983 | Stephens, Jr. .................. 75/11 |
| 4,420,332 A | 12/1983 | Mori et al. ..................... 75/26 |
| 4,539,188 A | 9/1985 | Hirsch et al. ................ 423/210 |
| RE32,247 E | 9/1986 | Stephens, Jr. .................. 75/11 |
| 4,668,414 A | 5/1987 | Okamura et al. ........ 252/62.51 |
| 4,676,824 A | 6/1987 | Daradimos et al. ........... 75/36 |
| 4,688,521 A | 8/1987 | Korenberg ................ 122/2 D |
| 4,781,358 A | 11/1988 | Langan ........................ 266/80 |
| 4,806,158 A | 2/1989 | Hirsch et al. .................. 75/26 |
| 4,841,884 A | 6/1989 | Engstrom et al. ........... 110/298 |
| 4,842,759 A | 6/1989 | Okamura et al. ........ 252/62.51 |
| 4,900,464 A | 2/1990 | Arase et al. .............. 252/62.55 |
| 4,931,198 A | 6/1990 | Arase et al. .............. 252/62.51 |
| 4,946,498 A | 8/1990 | Weber ............................ 75/26 |
| 5,026,605 A | 6/1991 | Kitamura et al. ........... 428/403 |
| 5,073,194 A | 12/1991 | Stephens et al. ............. 75/507 |
| 5,082,251 A | 1/1992 | Whipp ........................ 266/142 |
| 5,104,561 A | 4/1992 | Kitamura et al. ........ 252/62.51 |
| 5,118,479 A | 6/1992 | Stephens, Jr. et al. ...... 423/148 |
| 5,137,566 A | 8/1992 | Stephens, Jr. et al. ........ 75/507 |
| 5,151,206 A | 9/1992 | Okamura et al. ........ 252/62.51 |
| 5,167,932 A | 12/1992 | Ruottu ........................ 422/146 |
| 5,192,486 A | 3/1993 | Whipp ........................ 266/156 |
| 5,205,950 A | 4/1993 | Shibuya et al. .......... 252/62.51 |

(List continued on next page.)

FOREIGN PATENT DOCUMENTS

| | | |
|---|---|---|
| DE | 24 01 909 A | 7/1975 |
| DE | 44 26 623 A1 | 7/1995 |
| EP | 630 975 A1 | 12/1994 |
| GB | 747584 | 4/1956 |
| TT | 48 of 1994 | 3/1994 |
| WO | WO 92/02824 | 2/1992 |

*Primary Examiner*—Stuart L. Hendrickson
(74) *Attorney, Agent, or Firm*—Sheridan Ross P.C.

(57) ABSTRACT

The present invention is a process for the rapid conversion of iron oxide-containing material into iron carbide. The process includes a first step in which the iron oxide-containing material is contacted with a reducing gas that contains a high concentration of hydrogen gas to form a metallic iron-containing intermediate product and a second step in which the metallic iron-containing product is contacted with a carburizing gas having high concentrations of hydrogen and carbon monoxide gas to produce iron carbide. The unused carbon monoxide in the off-gas from the second step is not recycled to the second step but is used as a fuel source.

49 Claims, 2 Drawing Sheets

U.S. PATENT DOCUMENTS

| | | | |
|---|---|---|---|
| 5,366,897 A | 11/1994 | Hager et al. | 436/55 |
| 5,370,727 A | 12/1994 | Whipp | 75/436 |
| 5,382,277 A | 1/1995 | Rose | 75/450 |
| 5,386,974 A | 2/1995 | Hardie et al. | 266/157 |
| 5,387,274 A | 2/1995 | Dam et al. | 75/495 |
| 5,401,295 A | 3/1995 | Brotzmann | 75/500 |
| 5,431,711 A | 7/1995 | Meissner | 75/444 |
| 5,435,831 A | 7/1995 | Meissner | 75/444 |
| 5,445,667 A | 8/1995 | Malmström | 75/448 |
| 5,527,379 A | 6/1996 | Hirsch et al. | 75/436 |
| 5,858,057 A * | 1/1999 | Celada-Gonzalez et al. | 75/490 |
| 5,869,018 A | 2/1999 | Stephens et al. | 423/439 |

* cited by examiner

PROCESS FOR THE PRODUCTION OF IRON CARBIDE FROM IRON OXIDE USING EXTERNAL SOURCES OF CARBON MONOXIDE

CROSS-REFERENCE TO RELATED APPLICATION

The present application is a continuation-in-part of abandoned U.S. application Ser. No. 09/052,893, filed Mar. 31, 1998, which is incorporated herein by reference in its entirety.

FIELD OF THE INVENTION

The present invention relates to a method for producing iron carbide from an iron-containing feed material. More specifically, the present invention utilizes a two step process to convert iron oxide to metallic iron in the first step and metallic iron to iron carbide in the second step for use in steel-making.

BACKGROUND OF THE INVENTION

The steel industry has relied on a process that has been in use for many years for the conversion of iron ore into steel. The process converts iron ore into pig iron in a blast furnace using coke produced in a coke oven. The process next converts the pig iron or hot metal into steel in an open hearth or basic oxygen furnace.

In recent years, federal and local environmental regulations have caused numerous problems for steel producers using this steel-making process. The blast furnace and coke ovens used in the process are not only energy intensive but also responsible for most environmentally damaging emissions by steel producers. To redesign or modify blast furnaces and coke ovens to comply with pollution standards is expensive. The expense would cause the cost of steel produced by the conventional steel-making process to be non-competitive with steel produced by foreign competitors.

To address these problems, a process was developed for steel production that eliminates the blast furnace and coke oven in the steel-making process. In the process, a bed of iron oxide is fluidized by a single, multiple-component gas stream and directly converted into an iron carbide-containing product, primarily consisting of $Fe_3C$. The iron carbide is then added to a basic oxygen or electric arc furnace to produce steel. In the process, reduction and carburization reactions occur together in the same fluidized bed.

Another process has been applied to produce acicular iron carbides having desired magnetic characteristics for use in magnetic recording and as catalysts for converting CO and $H_2$ into lower aliphatic hydrocarbons. In the process, a bed of the acicular iron oxide is reduced by one gas and a bed of the reduced product is then carburized by another gas to produce acicular iron carbides of the form $Fe_5C_2$. The process suffers from slow reaction kinetics, large amounts of impurities (including iron oxide, free carbon and metallic iron) in the acicular iron carbide product, and poor gas efficiency (i.e., poor utilization of reactants in gas). The product, $Fe_5C_2$, is quite unstable and requires more carbon reagent to form than $Fe_3C$ (and is therefore more expensive to produce).

Other techniques to convert an iron-containing feed material into an iron carbide-containing product require expensive components, suffer from poor gas efficiency, and/or raise other operational complications.

It would be advantageous to provide a process to convert iron-containing materials into iron carbide that has a high gas utilization. It would be further advantageous to produce an iron carbide product with environmentally friendly and/or non-hazardous byproducts. It would be a further advantage to optimize the reaction kinetics of chemical reactions to convert iron-containing materials into iron carbide and to produce an iron carbide product that has high purity and low residual iron oxide.

Additionally, it would be advantageous to develop an environmentally friendly, energy efficient and inexpensive process to produce steel. It would be further advantageous to convert, inexpensively and efficiently, iron-containing materials into iron carbide for use in the production of steel.

SUMMARY OF THE INVENTION

In accordance with an embodiment of the present invention, a two step process for producing iron carbide from an iron oxide-containing feed material is provided. As used herein, "iron carbide" preferably includes $Fe_2C$ and $Fe_3C$, and "iron oxide" preferably includes $FeO$, $Fe_2O_3$, and $Fe_3O_4$. In the first (reduction) step, a feed material containing iron oxide is converted to an intermediate product by contacting the feed material with a reducing gas to reduce the iron oxide to metallic iron, and in a second (carburization) step the metallic iron is converted into an iron carbide product.

The reducing gas preferably contains sufficient hydrogen gas, the primary reducing agent, to perform substantially complete reduction of the iron oxides in the feed material to metallic iron. Typically, the reducing step is a closed circuit process so that virtually all of the reducing reagent is utilized by the process to remove oxygen from the feed material. Preferably, the predominant component of the reducing gas is hydrogen gas, and more preferably the reducing gas contains at least about 80 mole % hydrogen gas. Water, the byproduct of the reduction reaction, is easily removed from the first step off-gas by suitable techniques.

At least most of the iron in the intermediate product is in the form of metallic iron. Preferably, at least about 70 and more preferably at least about 90 mole % of the iron in the intermediate product is in the form of metallic iron. The intermediate product typically contains no more than about 35 mole percent iron carbide, more typically no more than about 25 mole percent, and more typically no more than about 10 mole percent iron carbide.

It is preferred that iron oxide be at least about 90 mole percent of the feed material in the first step on a water free basis. Preferably a substantial portion, and more preferably at least most, of the iron oxide in the feed material is converted to metallic iron in the first (reduction) step. The presence of iron oxides in the intermediate product is not desired since iron oxide can slow the reaction kinetics in the carburizing step and lengthen the necessary residence time of the material in the carburizing step for a desired degree of carburization.

In the carburization step, the intermediate product is contacted with a carburizing gas to produce an iron carbide product. The carburizing gas includes carbon monoxide and hydrogen gas. Preferably, the carburizing gas contains at least about 5 and more preferably at least about 15 mole % carbon monoxide and at least about 80 mole % hydrogen gas.

The carburizing gas can also include other components such as carbon dioxide, methane, water vapor and a diluent such as nitrogen or another inert gas. Preferably, the carburizing gas includes no more than about 5, more preferably no more than about 3, and more preferably no more than about 1 mole % carbon dioxide; preferably no more than about 15, more preferably no more than about 10, and more preferably no more than about 5 mole % methane; preferably no more than about 10, more preferably no more than about 1, and more preferably no more than about 0.5 mole % water vapor; and no more than about 10 mole % inert gases.

As will be appreciated, the temperatures of the carburizing gas and of the bed of the intermediate product during carburization are important to the reaction kinetics. Preferably, the carburizing gas has a gas temperature of at least about 550° C. and the intermediate product a bed temperature of at least about 500° C.

Because of the high concentration of carbon monoxide in the carburizing gas and the fact that the carbon monoxide directly converts metallic iron into iron carbide, less gas is required for complete carburization than in suitable two-step processes and the rate of the carburization reaction is relatively high. Compared to other two-step processes, the process of the present invention requires lower capacity components for a given throughput of feed material. The reduced capacity components significantly reduce capital and operating costs and water consumption.

At least most of the carbon monoxide in the carburizing gas is passed through the intermediate product only once (i.e., the carburizing step is preferably an open circuit while the reducing step is preferably a closed circuit). As used herein, a closed circuit means that at least most and more typically at least about 90 mole % of the reducing off-gas is recycled to the reducing step, and an open circuit means that no more than about 50 mole % and more typically no more than about 10 mole % of the carburizing off-gas is recycled to the carburizing step. Stated another way, at least most of the unreacted carbon monoxide in the carburizing gas is not recycled to the second step. Preferably, at least about 30%, more preferably at least about 50%, and more preferably at least about 65% of the carbon monoxide in the carburizing gas is reacted with the intermediate product in the single contact of the carburizing gas with the intermediate product. No more than about 30, more preferably no more than about 20, and more preferably no more than about 10 vol % of the carburizing off-gas is recycled to the carburizing step because if too much of the off-gas is recycled methane will build up in the carburizing gas and dilute the carbon monoxide concentration to relatively low levels.

The use of the carbon monoxide in the carburizing gas for only a single pass through the intermediate product is made economical at least in part by the use of the second step off-gas as a fuel source in other steps of the process, e.g., heating of the feed material and/or the reducing and/or carburizing gases prior to contacting the gases with the feed material and intermediate product, respectively. Preferably, at least about 80%, more preferably at least about 90%, and more preferably all of the carbon monoxide in the carburizing off-gas is used as a fuel source in one or more steps of the process. Typically, these preferred percentages of carbon monoxide represent no more than about 50, more typically no more than about 40, and more typically no more than about 30% of the carbon monoxide in the carburizing gas. The lower fuel costs offset the higher expense associated with forming more carburizing gas. Additionally, hydrogen gas can be separated from the off-gas of the carburizing step to reconstitute the reducing gas in the reducing step.

At least most of the iron carbide product is preferably iron carbide. It is desired that at least about 90 mole percent, and more preferably at least about 95 mole percent of the iron carbide be in the form of $Fe_3C$. $Fe_2C$ is not desired as it, unlike $Fe_3C$, is highly reactive and will oxidize upon exposure to air. Preferably, the iron carbide product contains no more than about 25 and more preferably no more than about 5 mole percent impurities, including metallic iron, free carbon, and iron oxide. Impurities such as metallic iron, free carbon, and iron oxide can cause problems if the iron carbide product is converted into steel and the steel processed into useful articles. By way of example, metallic iron in the iron carbide product can oxidize to form iron oxides which create difficulties in converting the iron carbide product into steel.

The high level of product purity is made possible by monitoring the composition of the carburizing off gas. Because methane is typically a minor component in the carburizing feed gas, it is practical to monitor the methane concentration in the carburizing reactor off gas to control the product quality. An increase in the methane concentration in the carburizing reactor off gas indicates that either 1) the metallic iron in the reactor has been converted to such a degree that there is no longer sufficient metallic iron present to pursue the preferred reaction (of forming iron carbide to consume the carbon monoxide), allowing the unconsumed carbon monoxide to react with the hydrogen in the process gas to form methane and water vapor which can then be observed in the reactor off gas, or 2) the process conditions (such as the temperature, pressure and/or process feed gas composition) have been altered to allow the iron carbide product in the reactor to back react with the hydrogen in the process gas to form methane and metallic iron. When or at some time before enough metallic iron in the intermediate product has formed iron carbide to permit the carbon monoxide in the process gas to back react and form methane, or before the iron carbide product itself can back react with the hydrogen in the process gas, the iron carbide product is removed from the reactor and more intermediate product is added to the reactor to increase the concentration of metallic iron and allow for the carbon monoxide in the process gas to form additional iron carbide.

In one embodiment, the iron carbide product is fed directly to an appropriate reactor for conversion into steel.

In one embodiment of the present invention, the process is a continuous process. Preferably, the two process steps are conducted in separate reaction zones to facilitate the continuity of the process. Preferably, in one or both process steps the reaction zone is a fluidized bed.

The present invention can have numerous advantages over existing methods besides those advantages discussed above. One embodiment of the present invention advantageously provides a continuous process to convert the iron-containing materials into iron carbide. The present invention thereby avoids the increase in operating expenses associated with batch processes.

Another embodiment of the present invention advantageously provides a process with rapid reaction kinetics. The composition of each gas can be selected to optimize the kinetics of the reaction in each process step. The reaction conditions, such as pressure, temperature, and gas compositions, can also be selected to optimize the kinetics of each reaction.

Another embodiment of the present invention advantageously provides a process that produces an iron carbide product of high purity. The iron carbide product is substantially free of impurities, including free carbon, iron oxide, and metallic iron.

Another embodiment of the present invention advantageously produces byproducts that are environmentally friendly and nonhazardous. The chief byproduct is water vapor.

Another embodiment of the present invention advantageously provides an environmentally friendly, energy efficient, and inexpensive process to make steel. The process eliminates the blast furnace and coke oven by direct conversion of iron-containing materials to iron carbide followed by the production of steel.

DETAILED DESCRIPTION

Figure 1:
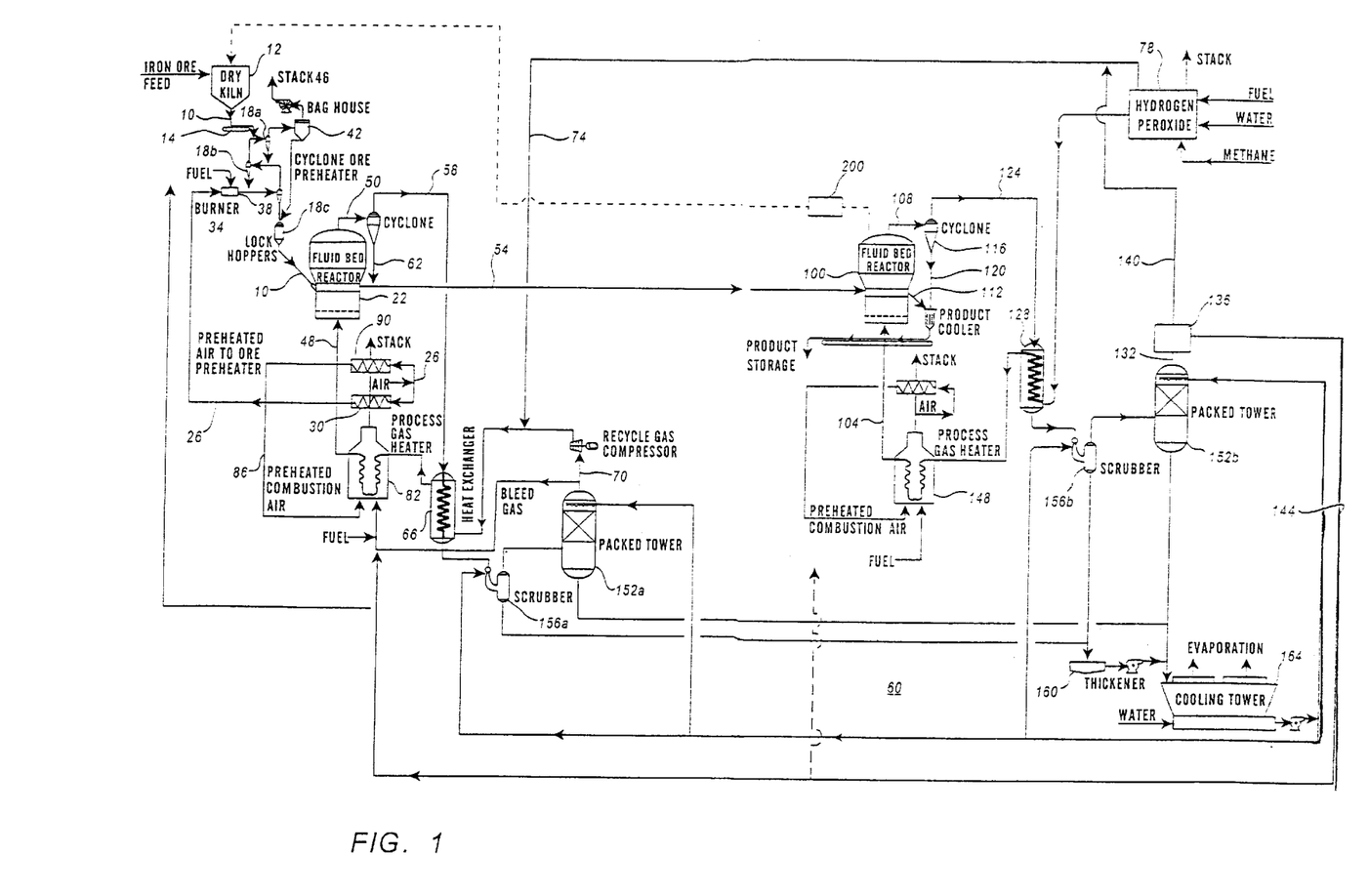
FIG. 1 is flow schematic of an embodiment of a process according to the subject invention, illustrating the two step approach to convert an iron-containing feed material into an iron carbide-containing product.

Referring to FIG. 1, in one embodiment of the present invention, an iron oxide-containing feed material 10 is transported from a storage bin 12 first by a conveyor 14 and then through entrainment in an oxidizing gas through first, second and third particle separators (e.g., cyclones) 18a–c to a lock hopper 19 and finally to a reducing reactor 22. The iron oxide-containing feed material 10 can be selected from a wide range of iron-containing materials, including iron ores and iron ore concentrates. Preferably, the feed material is one of or a mixture of several iron oxides, including magnetite ($Fe_3O_4$), hematite ($Fe_2O_3$), limonite ($Fe_2O_3 \cdot H_2O$), and geothite ($Fe_3O_4 \cdot H_2O$), FeO and iron hydroxides, including $Fe(OH)_2$ and $Fe(OH)_3$. More preferably, the feed material is a mixture of iron oxides and more preferably the feed material contains at least about 90 mole percent iron oxides on a water free basis. In some applications, such as iron ores and iron ore concentrates, the feed material 10 can include small amounts of water.

To oxidize the iron oxides and remove free water and other contaminants from the feed material 10, a split 26 of air or other oxidizing gas is passed through a heat exchanger 30 and a burner 34 where it is heated to a preferred temperature ranging from about 700 to about 1,200° C. The heated air 38 is contacted with the feed material 10 in the particle separators 18a–c to preheat the material to a preferred temperature ranging from about 150 to about 800° C. After heating the feed material 10 the air is passed through a baghouse or other filtration unit 42 from which it is vented 46 into the atmosphere.

The feed material 10 is preferably heated in an oxidizing atmosphere (e.g., air) to a temperature sufficient to oxidize iron oxide and other constituents of the feed material 10. This step increases iron carbide yield by converting magnetite into hematite and sulfide sulfur into sulfur dioxide gas or more stable sulfur compounds (e.g., thermally stable sulfates formed by the reaction of oxidized sulfide sulfur with alkali and alkaline earth oxides) and by removing or eliminating water as water vapor.

Conversion of the magnetite into hematite increases iron carbide yield, because hematite is more readily reduced to metallic iron in the reactor 22 than is magnetite. The unheated feed material 10 contains preferably at least about 70, more preferably at least about 85, and more preferably at least about 98 mole percent iron oxides on a water free basis. After heating, the iron oxide constituent in the feed material should contain preferably more than about 50, more preferably more than about 75, and more preferably more than about 95 mole percent hematite and preferably less than about 90, more preferably less than about 50, and more preferably less than about 5 mole percent magnetite.

Preferably, at least about 10, more preferably at least about 50, and more preferably at least about 95 mole percent of the magnetite in the iron material is converted into hematite during heating.

Iron carbide yield is further decreased by the presence of sulfide sulfur in the preheated feed material, because sulfide sulfur retards the conversion of metallic iron to iron carbide. The preheated feed material should contain preferably less than about 2, more preferably less than about 1, and more preferably less than about 0.1 mole percent sulfide sulfur.

Iron carbide yield is decreased by the presence of water or water vapor, because water vapor, being a byproduct of the conversion of iron oxides into metallic iron and metallic iron into iron carbide, can impose equilibrium constraints on the production of metallic iron and iron carbide. After preheating, the feed material should have preferably less than about 2, more preferably less than about 1, and more preferably less than about 0.5 mole percent water. The heating of the feed material is discussed in detail in copending U.S. patent application Ser. No. 08/181,997, filed Jan. 14, 1994, entitled "TWO STEP PROCESS FOR THE PRODUCTION OF IRON CARBIDE FROM IRON OXIDE;" U.S. patent application Ser. No. 08/596,954, filed Mar. 31, 1998, and entitled "PROCESS FOR CONVERTING IRON OXIDES TO IRON CARBIDE EMPLOYING INTERNALLY GENERATED CARBON OXIDE AS THE CARBIDING AGENT" (now issued as U.S. Pat. No. 5,733,357); and U.S. patent application Ser. No. 08/703,981, filed Aug. 28, 1996, and entitled "METHOD FOR PREHEATING FEED MATERIALS FOR THE PRODUCTION OF IRON CARBIDE", each of which is incorporated herein fully by reference.

The oxidized feed material is contacted with a reducing gas 48 in the reducing reactor 22 to produce a reducing off-gas 50 and an intermediate product 54. The reducing gas 48 contains hydrogen gas as the primary reducing agent to reduce the iron oxides in the feed material to metallic iron.

While not wishing to be bound by any theory, it is believed that hydrogen gas reduces iron oxides and hydroxides to metallic iron according to one or more of the following equations:

$$Fe_2O_3 + 3H_2 \rightarrow 2Fe + 3H_2O \quad (1)$$

$$Fe_3O_4 + 4H_2 \rightarrow 3Fe + 4H_2O \quad (2)$$

$$Fe(OH)_2 + H_2 \rightarrow Fe + 2H_2O \quad (3)$$

$$2Fe(OH)_3 + 3H_2 \rightarrow 2Fe + 6H_2O \quad (4)$$

Although carbon monoxide may also be used to reduce iron oxides and hydroxides to metallic iron, it is preferred that the reducing gas be substantially free of carbon monoxide. Carbon dioxide, the byproduct of the reduction reaction, is difficult to remove from the reducing off-gas 50 and free carbon can be deposited in the intermediate product 54 by the reaction. Commonly, a small amount of carbon monoxide will be present in the reducing gas because, when hydrogen gas is separated from the carburizing off-gas as discussed below, a small amount of carbon monoxide typically contaminates the hydrogen gas removed from the separating device.

The reducing gas has a relatively high concentration of hydrogen gas to rapidly convert the iron oxides in the feed material into metallic iron. Typically, the reducing gas 48 will contain at least about 15 times and more typically at least about 4 times the stoichiometric amount required to convert all of the iron oxides in the feed material into metallic iron. Preferably, the reducing gas contains at least about 80, more preferably at least about 85, and more preferably at least about 95 mole % hydrogen gas. The reducing gas preferably contains no more than about 5, more preferably no more than about 2, and more preferably no more than about 1 mole % carbon oxides and no more than about 15, more preferably no more than about 10, and more preferably no more than about 5 mole % methane.

The reaction conditions are maintained at levels that promote a relatively high rate of conversion of the iron oxides and hydroxides into metallic iron. Preferred reactions are: (i) a temperature of the feed material in the reducing reactor ranging from about 500 to about 800° C. and more preferably from about 550 to about 650° C. to produce pyrophoric metallic iron; (ii) a pressure in the reducing reactor ranging from about 1 to about 6 atm; and (iii) a gas velocity of at least about 0.5 and more preferably at least about 5 ft/sec. The number of moles of hydrogen gas that must be contacted with the each mole of iron in the feed material to produce the desired degree of reduction of iron oxides and hydroxides to metallic iron preferably is at least about 20 and more preferably at least about 10, and more preferably ranges from about 8 to about 4 moles of hydrogen gas/mole of iron.

It is preferred that at least about 65, more preferably at least about 80 and more preferably at least about 95 mole percent of the iron oxides and hydroxides in the feed material be converted to metallic iron in the reducing reactor 22. The iron component in the intermediate product 48 is preferably at least about 65, more preferably at least about 75, and more preferably at least about 90 mole percent metallic iron. The intermediate product 48 contains preferably no more than about 35, more preferably no more than about 25, and more preferably no more than about 10 mole percent iron carbide. Preferably, the intermediate product 48 contains no more than about 20 mole percent iron oxides and more preferably no more than about 10 mole percent iron oxides. The presence of iron oxides in the intermediate product 48 slows the reaction kinetics when the intermediate product is later converted in a carburizing reactor to iron carbide.

The reducing reactor 22 can be selected from a variety of reactors, including a fluidized bed reactor, rotary kiln, or a multiple hearth or shaft furnace. For the feed material having a $D_{80}$ size of no more than about 1 mm, the preferred reactor is a fluidized bed reactor. As used herein, the $D_{80}$ size refers to the particle size that 80% of the material is less than or equal to. For the feed material having a $D_{80}$ size of at least about 10 mm, the preferred reactor is a shaft furnace. Reducing reactor 22 could be a circulating fluidized bed reactor. The term "fluidized bed reactor" as used herein refers to a bubbling bed-fluidized bed reactor.

For a fluidized bed reactor, the bed depth of the feed material is preferably from about 1 to about 18 feet, more preferably from about 2 to about 12 feet, and more preferably about 3 feet to about 6 feet. The $D_{80}$ size of the feed material in the bed is preferably no more than about 2.5 mm, more preferably no more than about 2 mm, and more preferably ranging from about 0.1 to about 1 mm.

To efficiently convert the feed material to metallic iron in a fluidized bed reactor, it is preferable that the feed material remain in contact with the reducing gas 48 for a length of time sufficient to allow the diffusion controlled formation of metallic iron to proceed to completion. Preferably, the residence time is from about 30 to about 1,200 minutes, more preferably from about 60 to about 300 minutes, and more preferably from about 90 to about 150 minutes.

The reducing off-gas 50 is passed through a particle separation device, such as a cyclone, to form a treated off-gas 58 and removed particles 62. The treated off-gas 58 is passed through a heat exchanger 66 and to a gas purification system 60 discussed below to produce a purified off-gas 70. The purified off-gas 70 is reconstituted with hydrogen gas 74 from a hydrogen reformer 78 and/or from the hydrogen gas separator 136 and hydrogen gas stream 140 as discussed below to form the reducing gas 48. As will be appreciated, the hydrogen reformer 78 converts methane (or other hydrocarbon) and water into carbon monoxide and hydrogen gas. The reducing gas 48 is passed sequentially through the heat exchanger 66 and the process gas heater 82 to heat the reducing gas 48 to a preferred temperature ranging from about 500 to about 900° C. and returned to the reducing reactor 22. The process gas heater 82 utilizes a preheated combustion air which is heated by a heat exchanger 90 to combust the fuel to the heater. The removed particles are recombined with the intermediate product 54.

The intermediate product 54 is thereafter transferred from the reducing reactor 22 to a carburizing reactor 100 and contacted with a carburizing gas 104 to produce a carburizing off-gas 108 and an iron carbide product 112.

The carburizing gas 104 is a multiple component gas stream that converts the metallic iron and to a lesser extent the iron oxides in the intermediate product 54 into iron carbide. The primary components of the carburizing gas 104 are hydrogen gas and carbon monoxide.

While not wishing to be bound by any theory, it is believed that the carburizing gas 104 converts metallic iron to iron carbide according to one or more of the following equations:

$$3Fe+CO+H_2 \rightarrow Fe_3C+H_2O \qquad (5)$$

$$2Fe+CO+H_2 \rightarrow Fe_2C+H_2O \qquad (6)$$

Carbon monoxide provides carbon for forming iron carbide while hydrogen gas converts the released oxygen in the carbon monoxide into water, which is easily removed from the carburizing off-gas by suitable techniques.

The carburizing gas contains relatively high concentrations of carbon monoxide and hydrogen gas to provide a fairly rapid rate of conversion of metallic iron into iron carbide. Preferably, the carburizing gas includes at least about 300%, more preferably at least about 150%, and more preferably at least about 120% of the stroichiometric amount of carbon monoxide required to convert all of the metallic iron in the intermediate product into iron carbide. The carburizing gas preferably contains at least about 5, more preferably at least about 10, and more typically at least about 15 mole % carbon monoxide but typically no more than about 30 mole %, more typically no more than about 25 mole %, and more typically no more than about 20 mole % carbon monoxide. The carburizing gas preferably contains at least about 50, more preferably at least about 65, and more preferably at least about 80 mole % hydrogen gas. The carburizing gas contains typically more (and more typically at least about 200% more) moles of carbon monoxide than moles of carbon dioxide.

The carburizing gas can contain a diluent, such as an inert gas. Preferably, the concentration of the diluent in the carburizing gas is no more than about 10 and more preferably no more than about 5 mole %.

The conditions in the carburizing reactor 100 are selected to provide a fairly rapid rate of conversion of metallic iron into iron carbide. The reaction conditions are: (i) a temperature of the intermediate product in the reducing reactor ranging from about 450 to about 750° C., more preferably from about 500 to about 700° C., and more preferably from about 550 to about 650° C. to inhibit the metallic iron in the intermediate feed material from fusing or sticking together; (ii) a pressure in the reducing reactor ranging from about 1 to about 6 atm; and (iii) a gas velocity of at least about 0.5 and more preferably not more than about 5 ft/sec. The number of moles of carbon monoxide that must be contacted with the intermediate product to produce the desired degree of conversion of metallic iron to iron carbide preferably is not more than about 1 and more preferably not more than about 0.7, and more preferably ranges from about 0.35 to about 0.5 moles of carbon monoxide/mole of iron.

To efficiently convert the intermediate product 54 to iron carbide, it is preferable that the intermediate product 54 remain in contact with the carburizing gas 104 for a length of time sufficient to allow the diffusion controlled formation of iron carbide to proceed to completion.

The residence time in the reactor can be regulated by many techniques. For example, the product can be periodically or continuously sampled during the reaction, and the degree of conversion determined using a Mossbauer spectrometer and/or a LECO carbon analyzer. These and other measurement devices can also be used to determine the degree of conversion in the reduction step described above. In another technique, an infrared gas analyzer, a mass spectrometer, a gas chromatograph, a thermal conductivity meter (for hydrogen content), and/or other similar devices are used to monitor the concentration of a selected component in the reactor off-gas 108. In one configuration, the concentration of methane in the off-gas 108 is monitored using a gas analyzer. When the methane concentration rises to a predetermined maximum level, it is known that the reaction has reached a desired degree of completion. Continued residence of the iron carbide product in the reactor would cause a waste of carbon monoxide (which is expensive to produce) and/or risk a degradation in product purity due to back reaction of iron carbide to produce metallic iron and methane. As will be appreciated, the carbon monoxide and hydrogen gas will react to form progressively more methane and water vapor as the carburization reaction approaches substantial completion. When the methane concentration is below a predetermined minimum level, it is known that the reaction has not reached the desired degree of completion and product purity is inadequate. Typically, the predetermined maximum level is a methane concentration of about 15 mole % and more typically about 10 mole %, and the predetermined minimum level is a methane concentration of about 3 mole % and more typically about 5 mole %.

The methane level can be monitored manually or automatically. An operator interface, for example, can be manually (visually) monitored. Alternatively, a central processing unit 200 can monitor the methane concentration in the off-gas via measurement signal 204 (generated by a suitable measurement device) and provide a suitable control signal 208 to a control device (not shown) to adjust a specific process variable such as the feed rate of the oxidized feed material 10, the temperature of the process gas 48 and/or 104, the composition of the process gas in either 48 and/or 104 and/or the feed rate of the intermediate product 54. In one embodiment the unit 200 would access a look-up table containing a feed rate adjustment indexed against the methane concentration. By way of example, when the methane level falls below the predetermined minimum level, the feed rate of the metallic iron-containing intermediate product 54 can be slowed or decreased to provide a longer residence time in the carburization reactor and, when the methane level rises above the predetermined maximum level, the feed rate of the metallic iron-containing intermediate product 54 accelerated or increased to provide a shorter residence time in the carburization reactor. More exotic architectures would have each of a plurality of methane concentration ranges correlated against a respective feed rate (e.g., a feed rate control signal voltage level which corresponds to a respective feed rate).

As will be appreciated, gas stream components other than or in addition to methane can also be monitored to provide reaction information. For example, the concentration of carbon monoxide, carbon dioxide, water vapor, and/or hydrogen gas could be monitored.

Although longer or shorter residence times can be used, the residence time in the carburizing reactor 100 is preferably from about 60 to about 300 minutes, more preferably from about 45 to about 90 minutes, and more preferably from about 30 to about 60 minutes.

A relatively high rate of conversion of metallic iron into iron carbide is realized in the carburizing step. Preferably, at least about 80, more preferably at least about 90, and more preferably at least about 95 percent by weight of the metallic iron in intermediate product 54 is converted into iron carbide in the carburizing reactor 100.

The iron carbide product 112 is non-pyrophoric, contains a high percentage of iron, and has a high purity. The iron-containing materials in the iron carbide product 112 are preferably at least about 70, more preferably at least about 80, and more preferably at least about 90 mole percent iron carbide. The iron carbide product 112 preferably contains less than about 10 mole percent iron oxides, less than about 1 mole percent free carbon, and less than about 10 and more preferably less than about 2 mole percent metallic iron.

The iron carbide product 112 can have a layer of hydrogen on its surface upon exiting the carburizing reactor 100. Since catalytic combustion of the hydrogen can cause the material to become hot enough to oxidize, it is desirable to treat the iron carbide product to remove the hydrogen layer. The iron carbide product can, for example, be subjected to a flow of inert gas or placed in a vacuum to remove the hydrogen.

The carburizing reactor 100 is commonly the capacity and type of reactor as the reducing reactor 22. Likewise, for a fluidized bed reactor as the carburizing reactor 100, the bed depth of the intermediate product 54 is substantially the same as the bed depth of the feed material in the reducing reactor 22.

The iron carbide product is removed from the reactor and forwarded to product storage facilities or sent directly to a facility for manufacturing steel.

The carburizing off-gas has a composition that includes a number of components not necessarily present in the carburizing gas. Commonly, the carburizing off-gas includes from about 70 to about 95 mole % hydrogen gas, from about 2 to about 10 mole % methane, from about 1 to about 5 mole % carbon monoxide, from about 1 to about 2 mole % carbon dioxide, and water vapor.

The carburizing off-gas 108 is passed through a cyclone 116 or other suitable particle separating device to yield recovered particles 120 (which can be recombined with the iron carbide product 112 or returned to the carburizing reactor) and a treated carburizing off-gas 124. The treated carburizing off-gas 124 is passed through a heat exchanger 128 and is treated by the gas purification system 60 to produce a purified carburizing off-gas 132.

The purified carburizing off-gas 132 is preferably passed through a hydrogen gas separator 136 to produce a hydrogen rich gas stream 140 that may be used to reconstitute the reducing gas and a hydrogen gas-depleted gas stream 144. Preferably, at least about 50% and more preferably at least about 75% of the hydrogen gas in the purified off-gas 132 is recovered in the hydrogen gas stream 110 for reuse in the reducing step. The hydrogen gas separator is preferably a pressure swing absorption device which utilizes a porous pressurized substrate, such as a zeolite, to trap heavier gases than hydrogen gas in the pores. When the substrate is substantially filled with non-hydrogen gas, the off-gas bypasses the unit while the non-hydrogen gas is released from the substrate and the substrate is thereby regenerated.

Typically at least most and more typically at least about 95% of the carbon monoxide in the carburizing gas 104 makes only one pass through the intermediate product 54. Typically, at least most and more typically at least about 95% of the unreacted carbon monoxide in the off-gas 144 is thereafter used as a fuel source in other parts of the process, specifically to provide fuel for one or more of the reducing reactor 22, the gas heaters 82 and 148 and the hydrogen reformer 78.

Figure 2:
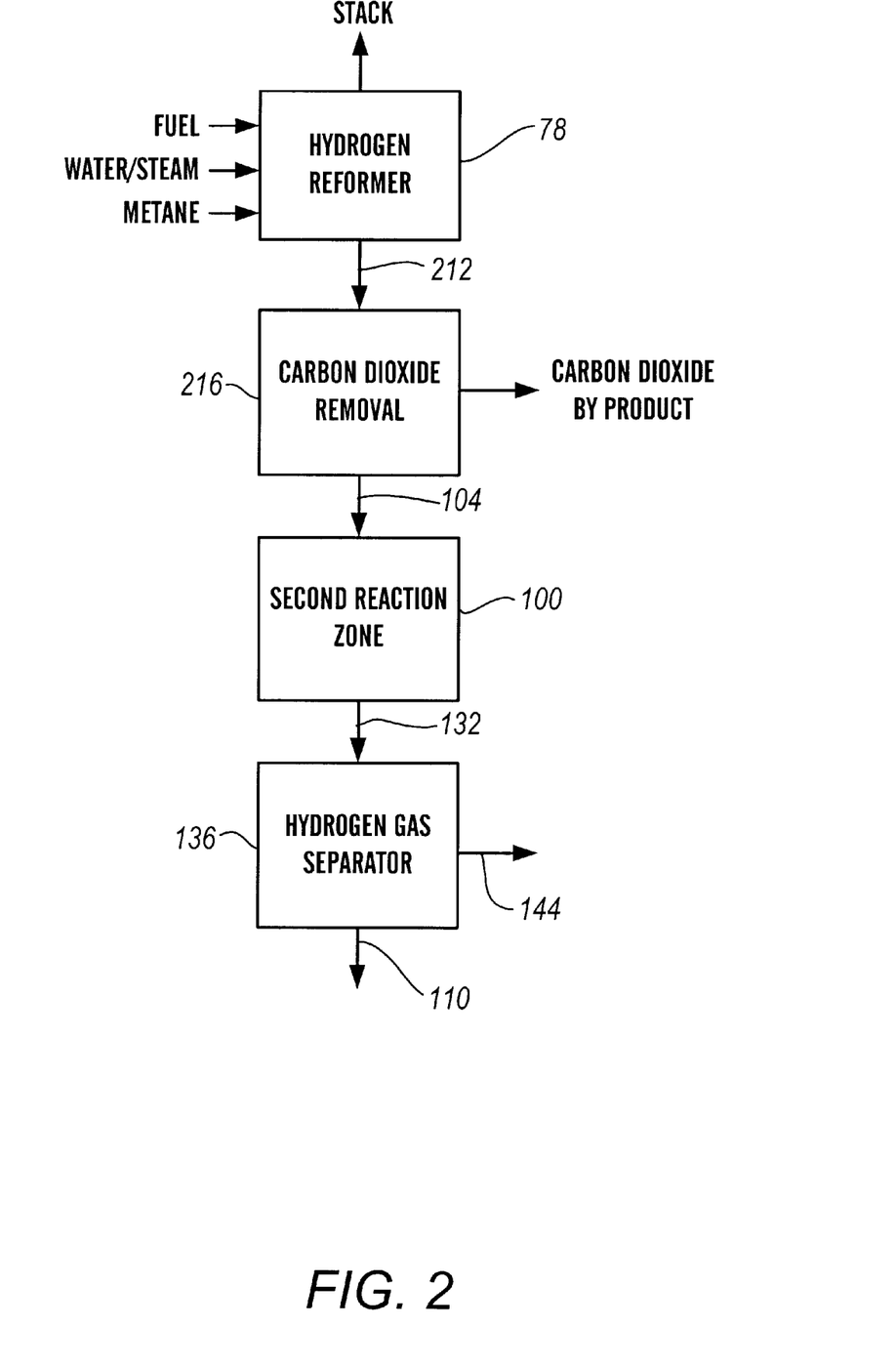
FIG. 2 is a flow schematic of an embodiment of a process to produce the carburizing gas.

FIG. 2 depicts one operational configuration of the hydrogen reformer 78 in more detail. The feed materials to the hydrogen reformer are typically methane ($CH_4$) (although other hydrocarbons can be used), steam ($H_2O$ vapor), and thermal energy or heat. In the reformer 78, the following reaction takes place:

$$CH_4 + H_2O \rightarrow 3H_2 + CO \qquad (7)$$

Because the reaction is endothermic, sufficient heat is added to the reaction to maintain a reaction temperature ranging from about 800 to about 900° C. In conventional processes, the output gas, which typically contains hydrogen gas, carbon monoxide, a small amount of carbon dioxide and methane, is passed to a shift converter where more steam is added to convert the carbon monoxide into carbon dioxide, and the output gas of the shift converter is forwarded to a carbon removal step to remove carbon dioxide and yield a substantially pure hydrogen gas. In the process of the present invention, the shift converter step is typically not performed. The product gas 212 of the reformer 78 is the source for the carburizing gas 104. The omission of the shift converter represents a significant cost savings relative to conventional two-step processes which use the shift converter.

To provide a proper mass balance in the carburizing reaction, the product gas 212 may be forwarded to a carbon dioxide removal step 216 to remove at least most and more preferably at least about 95% of the carbon dioxide (or methane) in the gas 212 to form a purified gas 220. For $Fe_3C$ as the product, the molar ratio of carbon to iron is 1:3, and for $Fe_2C$, the molar ratio of carbon to iron is 1:2 Moreover, the feed material 10 will contain oxygen (typically in a ratio of 1.5 atoms of oxygen per atom of iron to 1 atom of oxygen per atom of iron), each atom of which requires two hydrogen atoms to form water vapor. Accordingly, carbon dioxide, which effectively acts as an inert component (or diluent) in the carburizing step, is typically removed to provide a higher amount of reactive carbon and hydrogen gas per unit volume of the carburization gas and improved reaction kinetics.

The separation or removal of carbon dioxide can be effected by one or more suitable techniques. By way of example, the separation can be performed by passing the gas through a membrane having a pore size sufficient to pass carbon monoxide and/or hydrogen gas and to retain carbon dioxide, and carbon monoxide, and methane, and water vapor. Alternatively, an amine scrub (i.e., a scrubber using an amine-containing solution) can be used to remove carbon dioxide selectively. Alternatively, a pressure swing absorption process can be used. Alternatively, the gas can be passed through a reaction zone that converts carbon dioxide to carbon monixide. The concentration of carbon dioxide in the carburization gas 144 after carbon dioxide removal is typically no more than about 5 mole % and more typically no more than about 2 mole %.

The methane component of the gas can also be removed as desired by a suitable technique to a maximum level of about 65 mole %.

The carburizing gas 104 is made up of hydrogen gas and carbon monoxide from the hydrogen reformer 78. Preferably, at least about 50%, more preferably at least about 65%, and more preferably at least about 75% of the carbon monoxide in the carburizing gas is produced directly by the reformer before the carburizing gas is contacted with the intermediate product.

The carburizing gas 104 is passed through the heat exchanger 128 and the process gas heater 148 and heated to a temperature preferably ranging from about 500 to about 750° C. and more preferably from about 600 to about 650° C. before being introduced into the reducing reactor.

The gas treatment system 60 includes packed towers 152a and 152b, scrubbers 156a and 156b for contacting the reducing and carburizing off-gases 58 and 124, respectively. A thickener 160 and a cooling tower 164 treat the water and/or water vapor after use in a scrubber 156 or a packed tower 152 for gas purification.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for producing iron carbide, comprising:
   (a) contacting a feed material comprising an iron oxide with a reducing gas comprising predominantly hydrogen gas to produce a first product comprising predominantly metallic iron, wherein said first product contains no more than about 35mole percent iron carbide;
   (b) removing at least most of the carbon dioxide from a carburizing gas comprising carbon monoxide, carbon dioxide, methane, and hydrogen gas to form a concentrated carburizing gas; and
   (c) contacting said first product with the concentrated carburizing gas comprising hydrogen and carbon monoxide gas to form a carburizing off-gas and an iron carbide product, wherein at least most of the carbon monoxide in the carburizing off-gas is not recycled to the carburizing step after being used to carburize the first product.

2. The process, as claimed in claim 1, wherein at least most of the hydrogen gas in the reducing gas is not recycled from the carburizing gas after the carburizing gas is used to carburize the first product.

3. The process, as claimed in claim 1, further comprising:
   monitoring a component of the carburizing off-gas to determine the degree of conversion of metallic iron to iron carbide; and
   removing the iron carbide product from a reactor when the desired concentration of the component is reached to maximize reagent use and control back conversion of iron carbide to metallic iron.

4. The process, as claimed in claim 1, wherein said reducing gas comprises at least about 80 mole % hydrogen gas.

5. The process, as claimed in claim 1, wherein said reducing gas comprises at least about 90 mole % hydrogen gas.

6. The process, as claimed in claim 1, wherein steps (a) and (c) are conducted in separate reaction zones.

7. The process, as claimed in claim 1, wherein said contacting in step (a) comprises fluidizing a bed of said first feed material with said reducing gas, and said contacting in step (c) comprises fluidizing a bed of said first product with said concentrated carburizing gas.

8. The process, as claimed in claim 1, wherein said feed material comprises magnetite and hematite.

9. The process, as claimed in claim 1, wherein the feed material has a temperature ranging from about 150° C. to about 800° C.

10. The process, as claimed in claim 1, wherein said feed material has a D80 size ranging from about 10 mm to about 0.1 mm.

11. The process, as claimed in claim 1, wherein the off-gas from the formation of iron carbide from the first product comprises carbon monoxide and at least most of the carbon monoxide in the off-gas is used as a fuel source in the process.

12. The process, as claimed in claim 1, wherein at least about 4 moles of hydrogen gas/mole of iron in the feed material contact the feed material.

13. The process, as claimed in claim 1, wherein at least most of the carbon monoxide in the carburizing gas is produced in a reformer from water and methane and the carbon dioxide removal step occurs downstream of the reformer.

14. The process, as claimed in claim 1, wherein said first product comprises pyrophoric metallic iron.

15. The process, as claimed in claim 1, wherein the concentrated carburizing gas comprises at least about 10 mole % carbon monoxide.

16. The process, as claimed in claim 1, wherein the concentrated carburizing gas comprises an amount of hydrogen gas ranging from about 70 to about 90 mole %.

17. The process, as claimed in claim 16, wherein the concentrated carburizing gas comprises no more than about 15 mole % of methane.

18. The process, as claimed in claim 16, wherein the concentrated carburizing gas comprises no more than about 5 mole % of carbon dioxide.

19. The process, as claimed in claim 1, wherein the temperature of said first product in step (b) ranges from about 500 to about 800° C.

20. The process, as claimed in claim 1, wherein at least about 90% of the metallic iron in the first product is converted into iron carbide in step (b).

21. The process, as claimed in claim 1, wherein no more than about 30% of the carburizing off-gas is recycled to the contacting step (a).

22. The process, as claimed in claim 1, wherein at least about 2.7 moles of hydrogen gas/mole of iron in the first product are contacted with the first product in a second reaction zone.

23. The process, as claimed in claim 1, wherein at least about 0.5 moles of carbon monoxide/mole of iron are contacted with the first product in a second reaction zone.

24. The process, as claimed in claim 1, wherein at least about 30% of the carbon monoxide in the carburizing gas reacts with the metallic iron to form iron carbide.

25. The process, as claimed in claim 1, further comprising:
after step (c), combusting at least about 30% of the carbon monoxide in the carburizing gas to provide thermal energy in the process.

26. The process, as claimed in claim 1, further comprising:
after step (c), separating hydrogen gas from the other constituents in the carburizing off-gas to provide hydrogen gas for the reducing gas.

27. The process, as claimed in claim 1, wherein the product formed in step (c) contains no more than about 20 mole percent impurities.

28. The process, as claimed in claim 1, wherein the removing step (b) includes the substep of:
passing the carburizing gas through a membrane having a pore size sufficient to pass carbon monoxide and hydrogen gas and retain carbon dioxide.

29. A process for converting iron oxide into iron carbide, wherein the carburizing gas is externally generated and used on a once through basis, the process comprising:
(a) contacting, in a first reaction zone, an iron oxide-containing feed material with a reducing gas comprising primarily hydrogen gas to convert said iron oxide-containing feed material into a metallic iron-containing product;
(b) transporting the metallic iron-containing product to a second reaction zone different from the first reaction zone;
(c) separating at least one of carbon dioxide and methane from the other constituents in the carburizing gas; and
(d) when the metallic iron-containing product is in the second reaction zone, passing a carburizing gas comprising primarily carbon monoxide and hydrogen gas through a bed containing said metallic iron-containing product to form a carburizing off-gas and an iron carbide-containing product, wherein at least most of the carbon monoxide in the carburizing gas is passed through the bed only once.

30. The process, as claimed in claim 29, further comprising:
after step (c), separating hydrogen gas from the other constituents in the carburizing off-gas to provide hydrogen gas for the reducing gas and wherein no more than about 30% by volume of the carburizing off-gas is recycled to contacting step (a).

31. The process, as claimed in claim 29, wherein the carburizing gas includes at least about 80 mole % hydrogen gas.

32. The process, as claimed in claim 31, wherein the carburizing gas contains at least about 5 mole % carbon monoxide, no more than about 5 mole % carbon dioxide, and no more than about 15 mole % methane.

33. The process, as claimed in claim 29, further comprising:
(e) monitoring the concentration of a component of the carburizing off-gas to determine the degree of conversion of the metallic iron to iron carbide;
(f) altering the residence time of the iron carbide product in the reactor in response to the monitoring step to yield a desired degree of conversion of the metallic iron to the iron carbide.

34. The process, as claimed in claim 29, wherein at least about 50% of the carbon monoxide is produced in a hydrogen reformer before step (c).

35. The process, as claimed in claim 29, wherein the reducing gas in the first reaction zone is part of a closed circuit and the carburizing gas in the second reaction zone is part of an open circuit.

36. A process for converting iron oxide into iron carbide, comprising:

(a) contacting, in a first reaction zone, an iron-containing feed material with a reducing gas comprising primarily hydrogen gas to convert said iron-containing feed material into a metallic iron-containing product, at least about 65 mole % of the iron in the feed material is converted into metallic iron;

(b) transporting the metallic iron-containing product to a second reaction zone different from the first reaction zone;

(c) when the metallic iron-containing product is in the second reaction zone, passing a carburizing gas containing at least about 5 mole % carbon monoxide, no more than about 5 mole % carbon dioxide, no more than about 15 mole % methane, and at least about 80mole % hydrogen gas through a bed containing said metallic iron-containing product to form an iron carbide-containing product, wherein at least most of the carbon monoxide in the carburizing gas is passed through the bed no more than once, the gas temperature is more than about 450° C., at least about 50% of the carbon monoxide is formed by a hydrogen reformer directly before the passing step (c), and wherein the passing step (c) includes the substep of separating carbon dioxide from the carburizing gas;

(d) monitoring the composition of the carburizing off-gas to determine the degree of conversion of the metallic iron carbide;

(e) removing the iron carbide-containing product from a reactor when the desired degree of conversion is attained; and (f) after step (c), separating hydrogen gas from the other constituents in the carburizing off-gas to provide hydrogen gas for the reducing gas.

37. A process for converting metallic iron into iron carbide, comprising contacting a feed material comprising at least about 65 mole % metallic iron with a carburizing gas comprising at least about 10 mole % carbon monoxide and at least about 80 mole % hydrogen gas to form an iron carbide-containing product and a carburizing off-gas, wherein at least most of the unreacted carbon monoxide in the carburizing off-gas is consumed as a fuel source in the process after being passed through the feed material only once and wherein carbon dioxide is removed from the carburizing gas prior to the contacting step.

38. A process for producing iron carbide, comprising:

(a) contacting a feed material comprising an iron oxide with a reducing gas comprising at least about 80 mole percent hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas; and (c) contacting said first product with the concentrated carburizing gas comprising hydrogen and carbon monoxide gas to form a carburizing off-gas and an iron carbide product.

39. A process for producing iron carbide, comprising:

(a) contacting a feed material comprising an iron oxide with a reducing gas comprising about 90 mole percent hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas; and (c) contacting said first product with the concentrated carburizing gas comprising hydrogen and carbon monoxide gas to form a carburizing off-gas and an iron carbide product.

40. A process for producing iron carbide, comprising:

(a) contacting a feed material having a temperature ranging from about 150° C. to 800° C. comprising an iron oxide with a reducing gas comprising predominately hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas; and (c) contacting said first product with the concentrated carburizing gas comprising hydrogen and carbon monoxide gas to form a carburizing off-gas and an iron carbide product.

41. A process for producing iron carbide, comprising:

(a) contacting a feed material comprising an iron oxide with a reducing gas comprising predominantly hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas; and (c) contacting said first product with the concentrated carburizing gas comprising hydrogen and carbon monoxide gas, to form a carburizing off-gas and an iron carbide product, wherein the off-gas from the formation of iron carbide from the first product comprises carbon monoxide and at least most of the carbon monoxide in the off-gas is used as a fuel source in the process.

42. A process for producing iron carbide, comprising:

(a) contacting a feed material comprising an iron oxide with a reducing gas comprising predominately hydrogen gas to produce a first product comprising predominantly metallic iron, wherein said first product contains no more than about 35 mole percent iron carbide, and wherein at least about 4 moles of hydrogen gas/mole of iron in the feed material contact the feed material;

(b) removing at least most of the carbon dioxide from a carburizing gas comprising carbon monoxide, carbon dioxide, methane, and hydrogen gas to form a concentrated carburizing gas; and (c) contacting said first product with the concentrated carburizing gas comprising hydrogen and carbon monoxide gas to form a carburizing off-gas and an iron carbide product.

43. A process for producing iron carbide, comprising:

(a) contacting a feed material comprising an iron oxide with a reducing gas comprising predominately hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas; and (c) contacting said first product with the concentrated carburizing gas comprising an amount of hydrogen gas ranging from about 70 to 90 mole percent and carbon monoxide gas to form a carburizing off-gas and an iron carbide product.

44. The process as claimed in claim 43, wherein the concentrated carburizing gas comprises no more than about 15 mole percent of methane.

45. The process as claimed in claim 43, wherein the concentrated carburizing gas comprises no more than about 5 mole percent of carbon dioxide.

46. A process for producing iron carbide, comprising:

(a) contacting a feed material comprising an iron oxide with a reducing gas comprising predominately hydrogen gas to produce a first product comprising predominantly metallic iron, wherein said first product contains no more than about 35 mole percent iron carbide;

(b) contacting at least about 2.7 moles of hydrogen gas/mole of iron in the first product with the first product in a second reaction zone;

(c) removing at least most of the carbon dioxide from a carburizing gas comprising carbon monoxide, carbon dioxide, methane, and hydrogen gas to form a concentrated carburizing gas; and (d) contacting said first product with the concentrated carburizing gas comprising and carbon monoxide gas to form a carburizing off-gas and an iron carbide product.

47. A process for producing iron carbide, comprising:

(a) contacting a feed material comprising an iron oxide with a reducing gas comprising predominately hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas;

(c) contacting said first product with the concentrated carburizing gas comprising hydrogen and carbon monoxide gas to form a carburizing off-gas and an iron carbide product; and, (d) combusting at least about 30 percent of the carbon monoxide in the carburizing gas to provide thermal energy in the process.

48. A process for producing iron carbide, comprising:

(a) contacting a feed material comprising an iron oxide with a reducing gas comprising predominately hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas to form a concentrated carburizing gas;

(c) contacting said first product with the concentrated carburizing gas comprising hydrogen and carbon monoxide gas to form a carburizing off-gas and an iron carbide product; and, (d) separating hydrogen gas from the other constituents in the carburizing off-gas to provide hydrogen gas for the reducing gas.

49. A process for producing iron carbide, comprising:

(a) contacting a feed material comprising an iron oxide with a reducing gas comprising predominantly hydrogen gas to produce a first product comprising predominantly metallic iron, wherein said first product contains no more than about 35 mole percent iron carbide;

(b) removing at least most of the carbon dioxide from a carburizing gas comprising carbon monoxide, carbon dioxide, methane, and hydrogen gas, wherein the carburizing gas is externally generated and is not recycled after being used to carburize the first product, to form a concentrated carburizing gas; and (c) contacting said first product with the concentrated carburizing gas comprising hydrogen and carbon monoxide gas to form a carburizing off-gas and an iron carbide product.

* * * * *